United States Patent
Takeda et al.

(10) Patent No.: US 7,840,035 B2
(45) Date of Patent: Nov. 23, 2010

(54) INFORMATION PROCESSING APPARATUS, METHOD OF COMPUTER CONTROL, COMPUTER READABLE MEDIUM, AND COMPUTER DATA SIGNAL

(75) Inventors: Junichi Takeda, Kanagawa (JP); Hitoshi Ikeda, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 1015 days.

(21) Appl. No.: 11/515,198

(22) Filed: Sep. 5, 2006

(65) Prior Publication Data

US 2007/0206862 A1 Sep. 6, 2007

(30) Foreign Application Priority Data

Mar. 2, 2006 (JP) .............................. 2006-056970

(51) Int. Cl.
*G06K 9/00* (2006.01)
(52) U.S. Cl. ...................... 382/118; 382/103; 382/128; 382/181; 382/209
(58) Field of Classification Search ................. 382/103, 382/115–118, 128–132, 181, 195, 209, 217–219
See application file for complete search history.

(56) References Cited

U.S. PATENT DOCUMENTS

| | | | | |
|---|---|---|---|---|
| 5,497,430 | A * | 3/1996 | Sadovnik et al. ............. | 382/156 |
| 5,774,591 | A * | 6/1998 | Black et al. .................. | 382/236 |
| 5,933,527 | A * | 8/1999 | Ishikawa ..................... | 382/190 |
| 6,504,944 | B2 * | 1/2003 | Mihara et al. ............... | 382/118 |
| 6,879,709 | B2 * | 4/2005 | Tian et al. .................... | 382/118 |
| 7,058,209 | B2 * | 6/2006 | Chen et al. ................... | 382/117 |
| 2003/0021448 | A1 * | 1/2003 | Chen et al. ................... | 382/117 |

FOREIGN PATENT DOCUMENTS

| JP | A-07-311833 | 11/1995 |
|---|---|---|
| JP | A-2004-005384 | 1/2004 |
| JP | A-2005-234686 | 9/2005 |

OTHER PUBLICATIONS

Zhang, "Estimation of Eye and Mouth Corner Point Positions in a Knowledge-Based Coding System," Institut Fur Theoretische Nachrichtentechnik and Informationsverarbeitung Universitat Hannover, Hannover, Germany, pp. 1-8, 1996.
Cristinacce et al., "A Multi-Stage Approach to Facial Feature Detection," Dept. Imaging Science and Biomedical Engineering; University of Manchester, Manchester, UK.

* cited by examiner

*Primary Examiner*—Manav Seth
(74) *Attorney, Agent, or Firm*—Oliff & Berridge, PLC

(57) ABSTRACT

An image processing apparatus includes: an image pickup unit that images an image of a face; a first extraction unit that extracts a first image pattern as a correct solution pattern based on a sample image of the race; a second extraction unit that extracts a second image pattern as a counterexample pattern based on the sample image; a learning unit that learns a pattern recognition of the target part based on the first image pattern and the second image pattern; an identification unit that identifies a face area from the image of the face, the face area being an area where the face is shown; and a detection unit that detects a position of the target part from the face area based on the pattern recognition of the target part.

6 Claims, 6 Drawing Sheets

INFORMATION PROCESSING APPARATUS, METHOD OF COMPUTER CONTROL, COMPUTER READABLE MEDIUM, AND COMPUTER DATA SIGNAL

BACKGROUND

1. Technical Field

This invention relates to image processing and particularly to an art of detecting a part of a face from a picked-up image of the face.

2. Related Art

Hitherto, a detecting technique according to template matching of the feature amount independent of colors, such as luminance information has been proposed as an art of detecting parts (an eye, a nose, a mouth corner, etc.,) of a face. In the technique, a partial image is extracted from an image and the matching degree between the extracted partial image and a template is calculated. The most matched partial image is adopted as the face part of the detection target. Aside from the arts, a technique of detecting the area of each part using the color feature amounts of the face parts is also proposed.

It is therefore an object of the invention to provide an information processing apparatus and a computer control method and program capable of detecting a part of a face with accuracy while lightening processing load.

SUMMARY

According to an aspect of the invention, an image processing apparatus includes: an image pickup unit that images an image of a face; a first extraction unit that extracts a first image pattern as a correct solution pattern based on a sample image of the face, the first image pattern being an image pattern of a target part of the face; a second extraction unit that extracts a second image pattern as a counterexample pattern based on the sample image, the second image pattern being an image pattern of the target part in an adjacent area of the correct solution pattern; a learning unit that learns a pattern recognition of the target part based on the first image pattern and the second image pattern; an identification unit that identifies a face area from the image of the face, the face area being an area where the face is shown; and a detection unit that detects a position of the target part from the face area based on the pattern recognition of the target part.

BRIEF DESCRIPTION OF THE DRAWINGS

An exemplary embodiment of the present invention will be described in detail based on the following figures, wherein.

DETAILED DESCRIPTION

Referring now to the accompanying drawings (FIGS. 1 to 6), there is illustrated an exemplary embodiment of the invention.

To begin with, the configuration of an image processing apparatus 10 according to the invention will be discussed.

Figure 1:
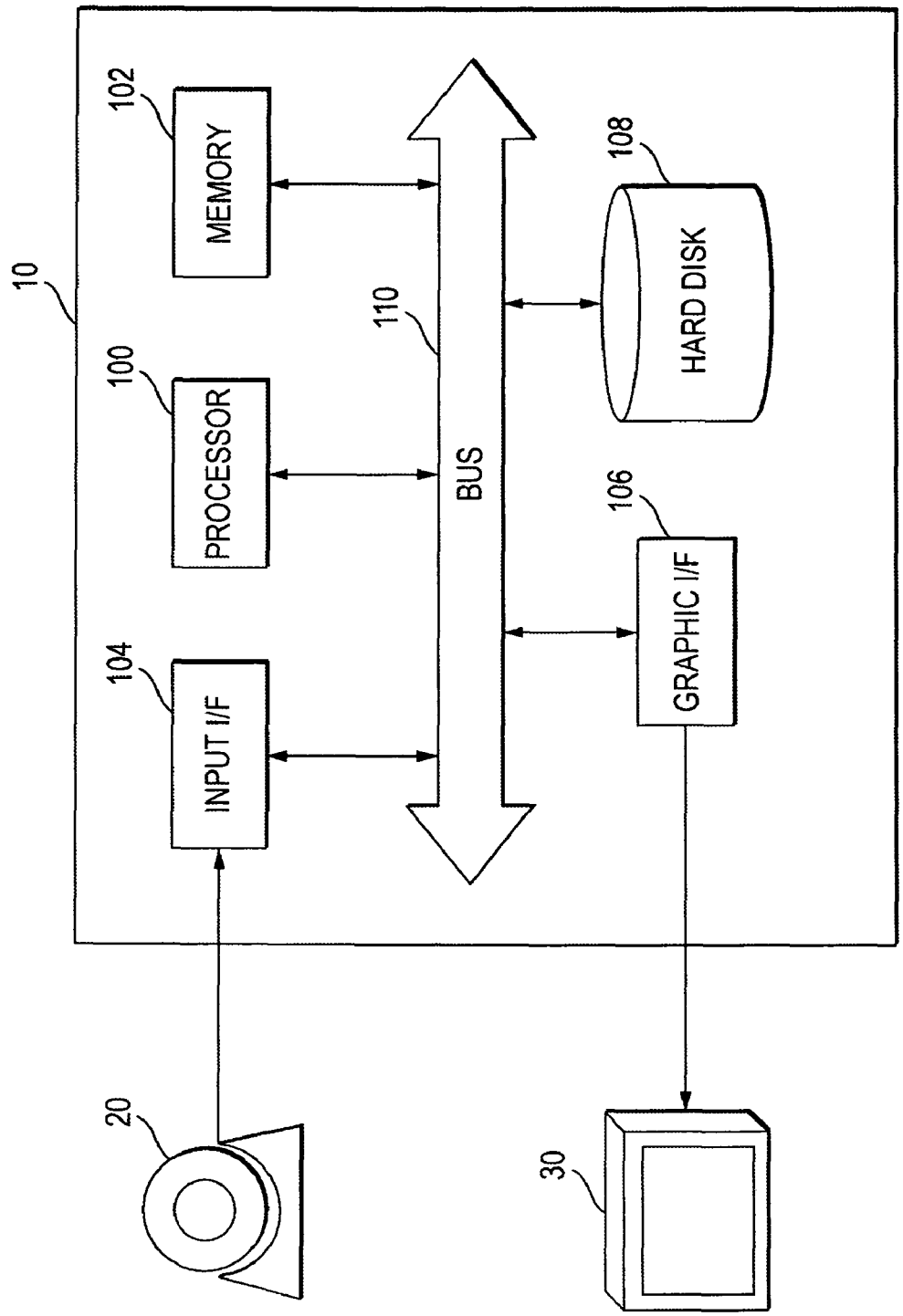
FIG. 1 is a block diagram that illustrates the hardware configuration of an image processing apparatus.

FIG. 1 is a block diagram to show the hardware configuration of the image processing apparatus 10. As illustrated in the figure, the image processing apparatus 10 includes a processor 100, memory 102, an input/output interface 104, a graphic interface 106, and storage of a hard disk 108, etc., as the physical configuration. The components are connected so that they can communicate with each other via a bus 110.

The processor 100 controls the components of the image processing apparatus 10 based on an operating system and programs stored in the storage of the hard disk 108, the memory 102, etc. A program and data are written into the memory 102 as required and the memory 102 is also used as work memory of the processor 100.

The input/output interface 104 is hardware for controlling input/output of data signals to/from the image processing apparatus 10. In the embodiment, a camera 20 is connected to the input/output interface 104. The input/output interface 104 may be based on the standard of a serial interface such as USB.

The graphic interface 106 includes video memory. It outputs an image to a connected display 30 in accordance with image data stored in the video memory in order.

Figure 2:
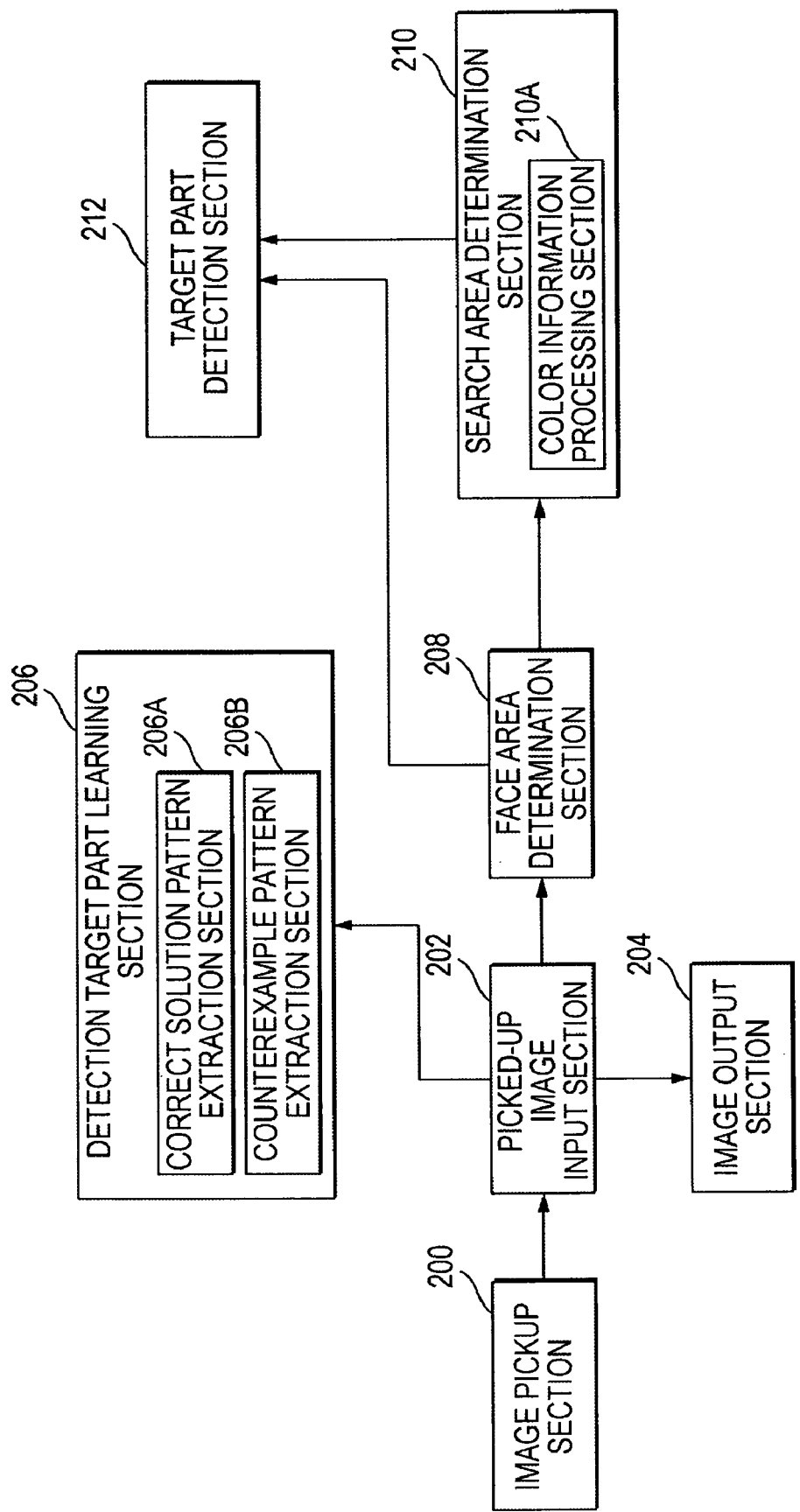
FIG. 2 is a functional block diagram or the image processing apparatus.

FIG. 2 is a functional block diagram of the image processing apparatus 10. As illustrated in the figure, the image processing apparatus 10 includes an image pickup section 200, a picked-up image input section 202, an image output section 204, a detection target part learning section 206, a face area determination section (serving as identification unit) 208, a search area determination section (serving as determination unit) 210, and a target part detection section 212 as the functional configuration. The sections will be discussed in detail below:

The image pickup section 200 has a function of picking up an image. The image pickup section 200 is a function provided by the camera 20 connected to the image processing apparatus 10. The camera 20 may be a WEB camera, etc., including a CCD camera and may be connected to the image processing apparatus 10 through a serial interface such as USB. The camera 20 may have a function of picking up an image in order at predetermined time intervals (for example, 1/60 seconds).

The picked-up image input section 202 has a function of accepting input of image data picked up in the image pickup section 200. The picked-up image input section 202 is a function provided by the input/output interface 104 of the image processing apparatus 10. The input/output interface 104 may be an interface such as USB.

The image output section 204 has a function of displaying an image based on the image data input to the picked-up image input section 202. The image output section 204 includes the display 30 connected to the image processing apparatus 10. The image output section 204 may add predetermined image processing to the input image data before outputting the resultant image.

The detection target part learning section 206 has a function of learning an image pattern of the target part of a face to be detected based on a sample image of a picked-up face image. The detection target part learning section 206 includes a correct solution pattern extraction section 206A and a counterexample pattern extraction section 206B. The sections perform processing of extracting an image pattern to learn image recognition of the target part from the sample image, as described later in detail. The detection target part learning section 206 inputs the image patterns extracted by the correct solution pattern extraction section 206A and the counterexample pattern extraction section 206B to a support vector machine for learning the image pattern of the target part.

Figure 3:
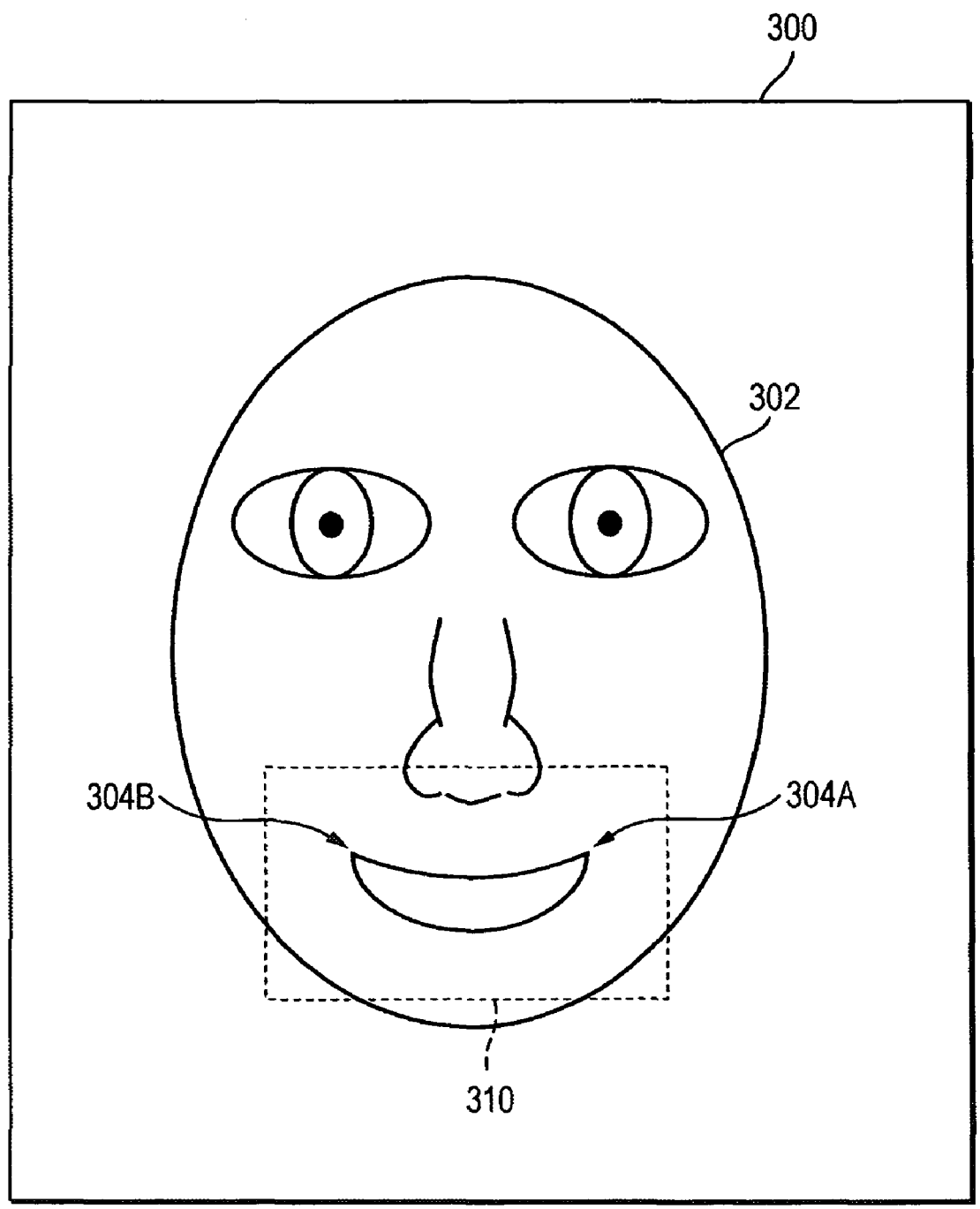
FIG. 3 is a drawing that illustrates an example of a sample image to learn image recognition.

FIG. 3 shows an example of a sample image input to the image processing apparatus 10. As illustrated in the figure, a sample image 300 contains a user face area 302. In the embodiment, the sample image 300 is a picked-up image of the whole face, but need not cover the whole face and may be a picked-up image of a mouth proximity area 310 containing the target parts to be learnt (in the embodiment, mouth corners 304A and 304B).

The correct solution pattern extraction section 206A has a function of extracting the image pattern of the target part of the face to be detected as a correct solution pattern based on a sample image of a picked-up face image. In the embodiment, mouth corners are adopted as the target parts. The correct solution pattern extraction section 206A extracts the image pattern of a picked-up image of the target mouth corner as the correct solution pattern based on the mouth corner contained in the sample image and the position coordinates of the mouth corner. If the position coordinates of the mouth corner are not previously known, the user may be allowed to specify the mouth corner position with a pointing device such as a mouse for acquiring the position coordinates of the mouth corner.

The counterexample pattern extraction section 206B has a function of extracting the image pattern within a predetermined range in the proximity of the correct solution pattern as a counterexample pattern of the target part based on the sample image of the picked-up face image. In the embodiment, the counterexample pattern extraction section 206B determines based on the position coordinates of the mouth corner contained in the sample image that the position at a predetermined offset distance from the position coordinates is the extraction position of the image pattern. The counterexample pattern extraction section 206B extracts the image pattern of a predetermined size as the counterexample pattern. Plural partial images within a predetermined range from the position of the target part may be extracted as the counterexample pattern.

Figure 4:
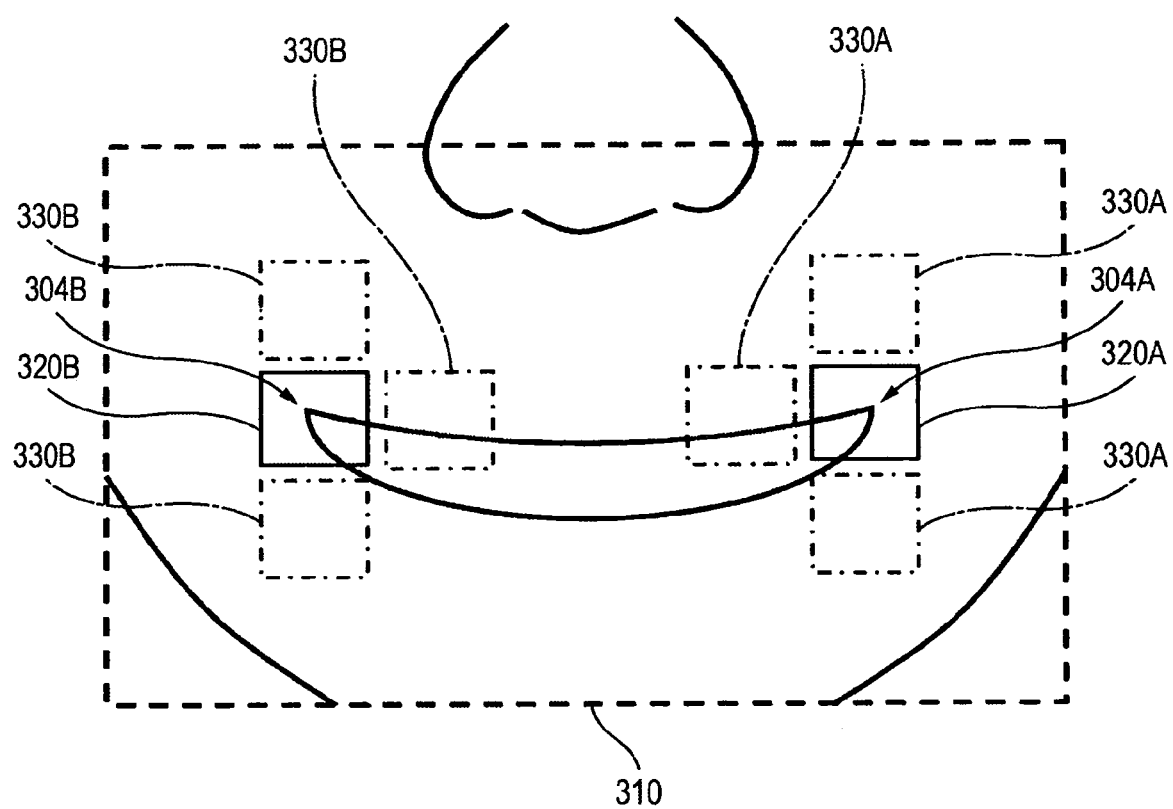
FIG. 4 is an enlarged drawing of a part of the sample image.

The correct solution pattern and the counterexample pattern will be discussed specifically with reference to FIG. 4. FIG. 4 is an enlarged drawing of the mouth proximity area 310 of the face in FIG. 3. As illustrated in FIG. 4, correct solution patterns 320A and 320B are partial images containing mouth corners 304A and 304B. The correct solution pattern 320A corresponds to the mouth corner 304A and the correct solution pattern 320B corresponds to the mouth corner 304B. Partial images illustrated in the proximity of the correct solution patterns 320A and 320B are counterexample patterns 330A and 330B of the mouth corners. The counterexample pattern 330A corresponds to the mouth corner 304A and the counterexample pattern 330B corresponds to the mouth corner 304B. Of course, the number and the positions of the counterexample patterns to be extracted are not limited to those illustrated in FIG. 4 and may be different therefrom.

The detection target part learning section 206 adds "+1" as label data to the image pattern extracted in the correct solution pattern extraction section 206A and inputs the image pattern to the support vector machine. The detection target part learning section 206 adds "−1" as label data to the image pattern extracted in the counterexample pattern extraction section 206B and inputs the image pattern to the support vector machine. When all image patterns have been input to the support vector machine, image recognition learning is executed. The parameters provided by performing the learning processing are stored in the memory 102.

The face area determination section 208 has a function of determining the area where the user face is shown from the picked-up image. The face area determination section 208 determines the face area from the whole of the picked-up image in FIG. 3, for example. Various face area determination techniques are proposed. In the invention, the known face area determination techniques maybe used. As an example of the face area determination technique, "technique of detection apparatus of face of person" described in patent document 3 may be used. The face area determination section 208 is a function provided as a program created according to an algorithm based on the face area determination technique is read into the memory 102 and the processor 100 operates in accordance with the read program.

The search area determination section 210 has a function or determining a search area where a search is made for the target part based on color information of the face area determined by the face area determination section 208. The search area determination section 210 includes a color information processing section 210A. The color information processing section 210A has a function of calculating the threshold value of mouth corner search based on the color information of the determined face area. In the embodiment, processing of determining the search area when the target part is a mouth corner will be discussed below:

To begin with, the processor 100 of the image processing apparatus 10 estimates the position of the center point of the face area from the coordinate data of the determined face area. The processor 100 calculates the average value of red components of the complexion from the horizontal line passing through the estimated center point. The processor 100 calculates the maximum value of red components of the complexion from the vertical line passing through the center point of the determined face area. Next, the processor 100 further calculates the average value of the average value and the maximum value of the red components previously calculated. The value is adopted as the threshold value in mouth corner search. The processor 100 determines that the area having a red component equal to or greater than the calculated threshold value in the determined face area is the search area.

The target part detection section 212 has a function of detecting the position of the target part according to pattern recognition learnt by the detection target part learning section 206 from within the face area determined by the face area determination section 208. The target part detection section 212 extracts a partial image in order at predetermined intervals from within the search area determined by the search area determination section 210. Pattern matching as to whether or not each extracted partial image matches the image pattern or the target part is performed in order. The pattern matching is performed using the support vector machine previously learning image recognition of the target part. As the pattern matching is performed, the position of the partial image most matching the target part is detected as the position of the target part.

Figure 5:
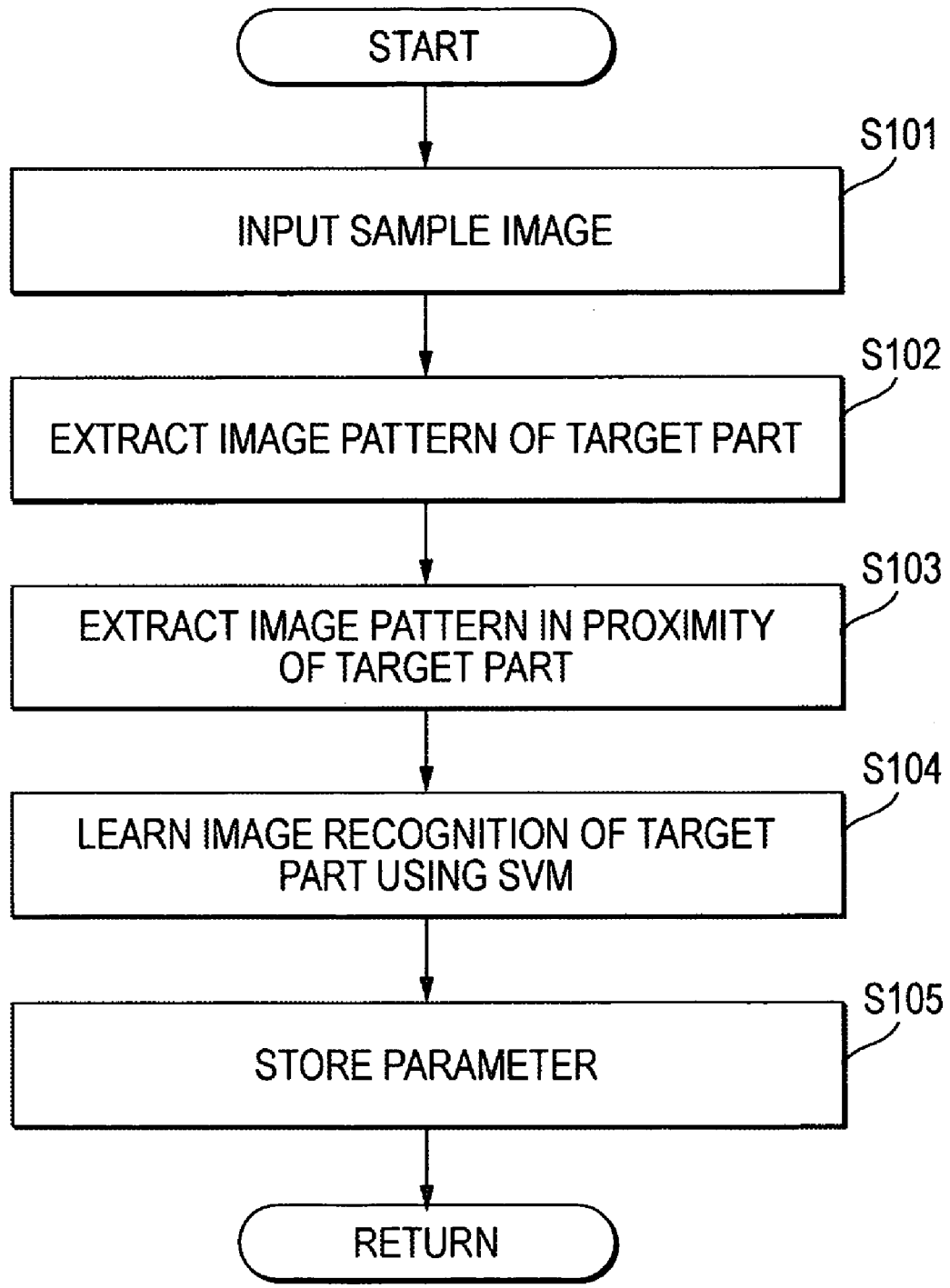
FIG. 5 is a flowchart of learning processing of the image processing apparatus.

A processing flow of the image processing apparatus 10 according to the embodiment of the invention will be discussed below:

FIG. 5 is a flowchart of learning processing of learning image recognition of a target part by the image processing apparatus 10. As illustrated in the figure, the image processing apparatus 10 accepts input of a gray scale image containing a mouth corner for face recognition learning (S101). The image processing apparatus 10 extracts the mouth corner image pattern based on the coordinate information indicating the position of the mouth corner in the input image data (S102). The coordinate information may be specified by the user with a pointing device such as a mouse. In addition to the mouth corner image pattern, the image processing apparatus 10 extracts an image pattern in a predetermined range in the proximity of the extracted image pattern as a counterexample pattern (S103) Plural counterexample patterns may be extracted at S103.

Next, the label data of the image pattern extracted at S102 is incremented by one and the label data of the image pattern extracted at S103 is decremented by one before input to the support vector machine for learning the mouth corner image pattern (S104). As the counterexample pattern is also input, the support vector machine for indicating a negative reaction to a pattern where the mouth corner position shifts can be generated. Thus, among the patterns in the proximity of the mouth corner, the support vector machine indicates a positive reaction only to the pattern where the mouth corner is at the center, and it is made possible to detect the precise mouth corner position. The parameter obtained as the result of learning at S104 is stored in the memory 102 (S105) so that the parameter can be used when a mouth corner is detected for an image picked up by the camera 20.

Figure 6:
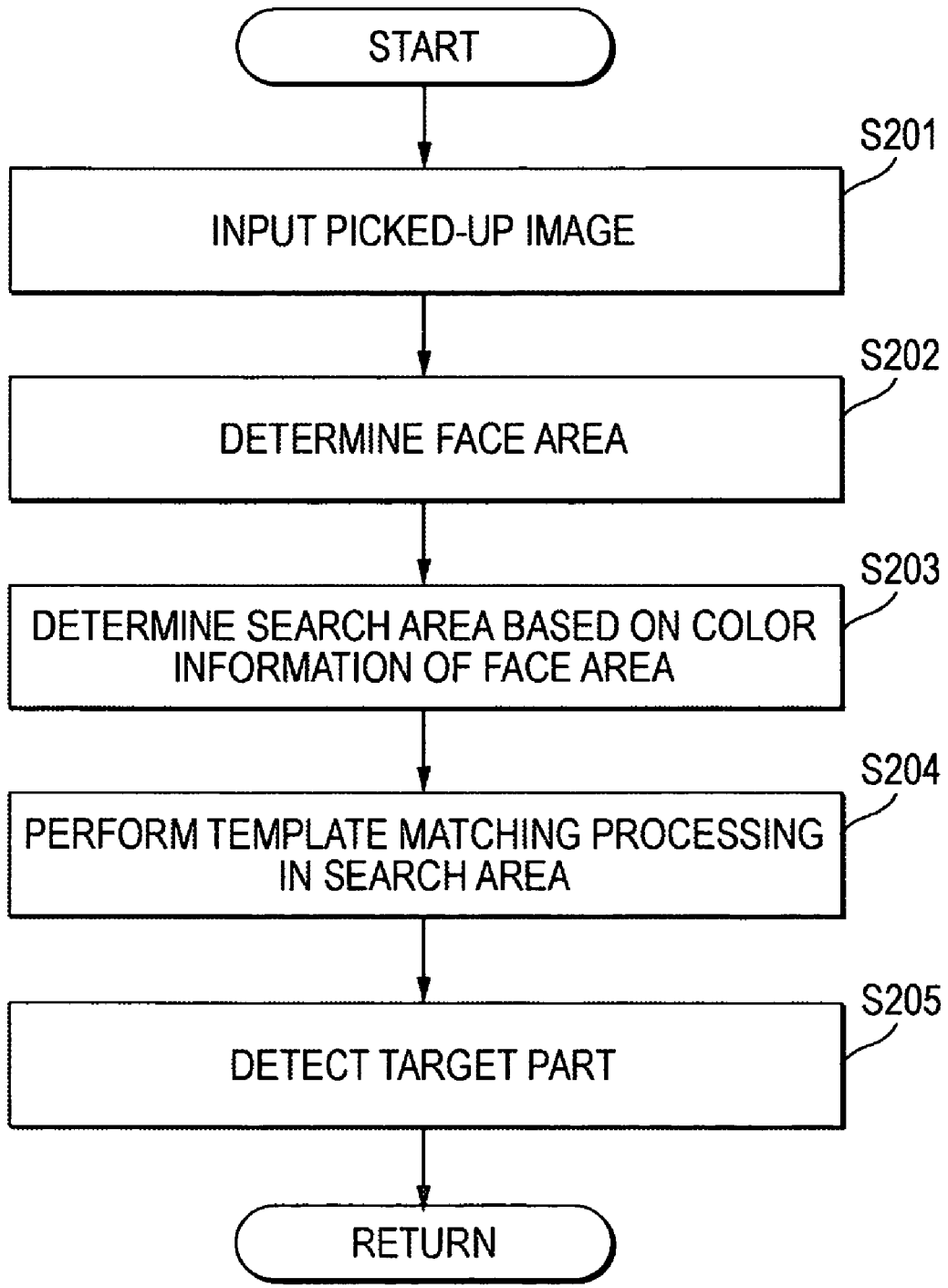
FIG. 6 is a flowchart of image recognition processing of the image processing apparatus.

FIG. 6 is a flowchart of processing of detecting a target part of a face by the image processing apparatus 10. As illustrated in the figure, the image processing apparatus 10 accepts input of an image picked up by the camera 20 (S201). The image processing apparatus 10 determines the face area where the face of the user is shown from the input image (S202). It determines the threshold value of the color of the red component based on the red component of the complexion for the determined face area. The image processing apparatus 10 determines that the area having a red component equal to or greater than the calculated threshold value is the search area (S203). The image processing apparatus 10 extracts a partial image in order at predetermined intervals from the search area. It calculates the distance from the determination boundary of the support vector machine previously learnt about the feature amount calculated from the extracted partial image (hereinafter, the processing will be referred to as template matching processing (S204)). The image processing apparatus 10 applies the template matching processing to the extracted partial images in order and detects the extraction position of the partial image having the largest distance value as the mouth corner position (S205) and terminates the processing.

The image processing apparatus 10 according to the embodiment of the invention described above can detect a face part with accuracy based on image recognition learnt according to the correct solution pattern and the counterexample pattern of the detection target part. The image processing apparatus 10 according to the invention can decrease the number of iterations of template matching in detecting the face part, so that the processing load can be lightened.

The invention is not limited to the embodiment described above.

For example, the image processing apparatus 10 according to the embodiment adopts the mouth corner as the detection target, but is not limited to it and can be applied to various parts of a nose, etc. To adopt a nose as the detection target according to the invention, the search area may be determined as follows:

The processor 100 of the image processing apparatus 10 calculates the average value of luminance components of the complexion from the horizontal line passing through the center point of the detected face. The processor 100 calculates the minimum value of luminance components of the complexion from the vertical line passing through the center point of the detected face. Next, the processor 100 further calculates the average value or the calculated average value and the calculated minimum value and adopts the value as the threshold value in nose search. The processor 100 determines that the area having a luminance component equal to or less than the previously calculated threshold value in the detected face area is the search area.

FIG. 5
S101 INPUT SAMPLE IMAGE
S102 EXTRACT IMAGE PATTERN OF TARGET PART
S103 EXTRACT IMAGE PATTERN IN PROXIMITY OF TARGET PART
S104 LEARN IMAGE RECOGNITION OF TARGET PART USING SVM
S105 STORE PARAMETER
FIG. 6
S201 INPUT PICKED-UP IMAGE
S202 DETERMINE FACE AREA
S203 DETERMINE SEARCH AREA BASED ON COLOR INFORMATION OF FACE AREA
S204 PERFORM TEMPLATE MATCHING PROCESSING IN SEARCH AREA
S205 DETECT TARGET PART

What is claimed is:

1. An image processing apparatus comprising:
an image pickup unit that takes an image of a first face;
a first extraction unit that extracts a first image pattern as a correct solution pattern from a sample image of a second face, the first image pattern being an image pattern of a target part of the second face;
a second extraction unit that determines, based on the first image pattern, a second image pattern as a counterexample pattern from the sample image, the second image pattern being an image pattern adjacent to the correct solution pattern;
a learning unit that learns a pattern recognition of the target part based on the first image pattern and the second image pattern;
an identification unit that identifies a face area of the first face from the taken image of the first face, the face area being an area where the first face is shown; and
a detection unit that detects a position of the target part from the first face area based on the pattern recognition of the target part.

2. The image processing apparatus as claimed in claim 1, which comprises:
a determination unit that determines a search area based on color information of the first face, the search area being an area where a search is made for the target part,
wherein the detection unit detects the position of the target part from the search area based on the pattern recognition of the target part.

3. The image processing apparatus as claimed in claim 2, wherein
the target part is a mouth corner, and
the determination unit determines the search area based on a red component of complexion of the first face area.

4. The image processing apparatus as claimed in claim 2, wherein
the target part is a nose, and
the determination unit determines the search area based on luminance of complexion of the first face area.

5. A control method of an image processing apparatus, which comprises:
taking an image of a first face;
extracting, using a processor, a first image pattern as a correct solution pattern from a sample image of a second face, the first image pattern being an image pattern of a target part of the second face;

determining, based on the first image pattern, a second image pattern as a counterexample pattern from the sample image, the second image pattern being an image pattern adjacent to the correct solution pattern;

learning a pattern recognition of the target part based on the first image pattern and the second image pattern;

identifying a face area of the first face from the taken image of the first face, the face area being an area where the first face is shown; and detecting a position of the target part from the first face area based on the pattern recognition of the target part.

6. A non-transitory computer readable medium storing a program causing a computer to execute a process for controlling an image processing apparatus, which comprises:

taking an image of a first face;

extracting a first image pattern as a correct solution pattern from a sample image of a second face, the first image pattern being an image pattern of a target part of the second face;

determining, based on the first image pattern, a second image pattern as a counterexample pattern from the sample image, the second image pattern being an image pattern adjacent to the correct solution pattern;

learning a pattern recognition of the target part based on the first image pattern and the second image pattern;

identifying a face area of the first face from the taken image of the first face, the face area being an area where the first face is shown; and detecting a position of the target part from the first face area based on the pattern recognition of the target part.

\* \* \* \* \*